(12) United States Patent
Gonzales

(10) Patent No.: US 9,614,959 B2
(45) Date of Patent: Apr. 4, 2017

(54) CLASSIFYING COMMUNICATIONS WITH HUMAN-BASED INTERACTIVE QUESTIONS

(71) Applicant: EBAY INC., San Jose, CA (US)

(72) Inventor: Sergio Gonzales, San Jose, CA (US)

(73) Assignee: EBAY INC., San Jose, CA (US)

(*) Notice: Subject to any disclaimer, the term of this patent is extended or adjusted under 35 U.S.C. 154(b) by 24 days.

(21) Appl. No.: 14/555,201

(22) Filed: Nov. 26, 2014

(65) Prior Publication Data

US 2016/0150082 A1  May 26, 2016

(51) Int. Cl.
  *H04W 4/12* (2009.01)
  *H04M 3/493* (2006.01)
  *H04W 68/00* (2009.01)
  *H04W 4/16* (2009.01)
  *H04L 29/06* (2006.01)

(52) U.S. Cl.
  CPC ...... *H04M 3/4936* (2013.01); *H04L 65/1069* (2013.01); *H04L 65/403* (2013.01); *H04W 4/12* (2013.01); *H04W 4/16* (2013.01); *H04W 68/005* (2013.01)

(58) Field of Classification Search
  None
  See application file for complete search history.

(56) References Cited

U.S. PATENT DOCUMENTS

| | | |
|---|---|---|
| 4,277,649 A | 7/1981 | Sheinbein |
| 6,353,663 B1 | 3/2002 | Stevens et al. |
| 6,542,583 B1 * | 4/2003 | Taylor ............... H04M 1/642 379/142.05 |
| 6,714,630 B1 | 3/2004 | Baum |
| 7,035,385 B2 | 4/2006 | Levine et al. |
| 8,135,119 B1 * | 3/2012 | Zhao .................. H04M 1/57 370/352 |
| 8,634,520 B1 * | 1/2014 | Morrison ........... H04M 3/4878 370/241 |
| 8,750,482 B2 | 6/2014 | Chingon et al. |
| 9,226,159 B1 * | 12/2015 | Cao .................... H04W 12/12 |
| 2003/0152198 A1 * | 8/2003 | Price ................... H04M 1/663 379/67.1 |
| 2003/0196116 A1 * | 10/2003 | Troutman ........... H04L 12/585 726/7 |
| 2005/0055410 A1 * | 3/2005 | Landsman .......... H04L 12/585 709/206 |
| 2006/0246881 A1 | 11/2006 | Winkler et al. |

(Continued)

*Primary Examiner* — Mazda Sabouri
(74) *Attorney, Agent, or Firm* — Maschoff Brennan

(57) ABSTRACT

A method may include receiving a communication that is sent from a source over a network to a user. The method may also include categorizing the communication request. The categorization may include sending a first question communication that includes a first human-based interactive question over the network to the source. The categorization may also include receiving an answer communication over the network from the source and determining whether the answer communication correctly answers the first question communication. In response to determining that the answer communication correctly answers the first question communication, a second question communication that includes a second human-based interactive question may be sent over the network to the source instead of performing a first task with the received communication.

13 Claims, 6 Drawing Sheets

(56) References Cited

U.S. PATENT DOCUMENTS

| | | | |
|---|---|---|---|
| 2007/0033256 A1* | 2/2007 | Ben-Itzhak | G06Q 10/107 709/206 |
| 2013/0263230 A1* | 10/2013 | Gorodyansky | H04L 63/083 726/4 |
| 2014/0185786 A1* | 7/2014 | Korn | H04M 3/4365 379/210.02 |
| 2015/0036808 A1* | 2/2015 | Charugundla | H04M 3/436 379/88.18 |

* cited by examiner

CLASSIFYING COMMUNICATIONS WITH HUMAN-BASED INTERACTIVE QUESTIONS

FIELD

The embodiments discussed herein are related to classifying communications with human-based interactive questions.

BACKGROUND

People use many different electronic forms of communication to communicate with each other. For example, people may communicate using text messages, email, phone calls, and video conferencing, among other forms of electronic communication. Businesses may also use electronic communication to connect with potential or current customers. In some instances, businesses may use electronic communication to solicit new customers or to obtain information, such as opinions or past monies due, from current or previous customers. In some situations, such as at dinner time, people may not appreciate being disturbed by electronic communications and may avoid responding to any such electronic communications.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
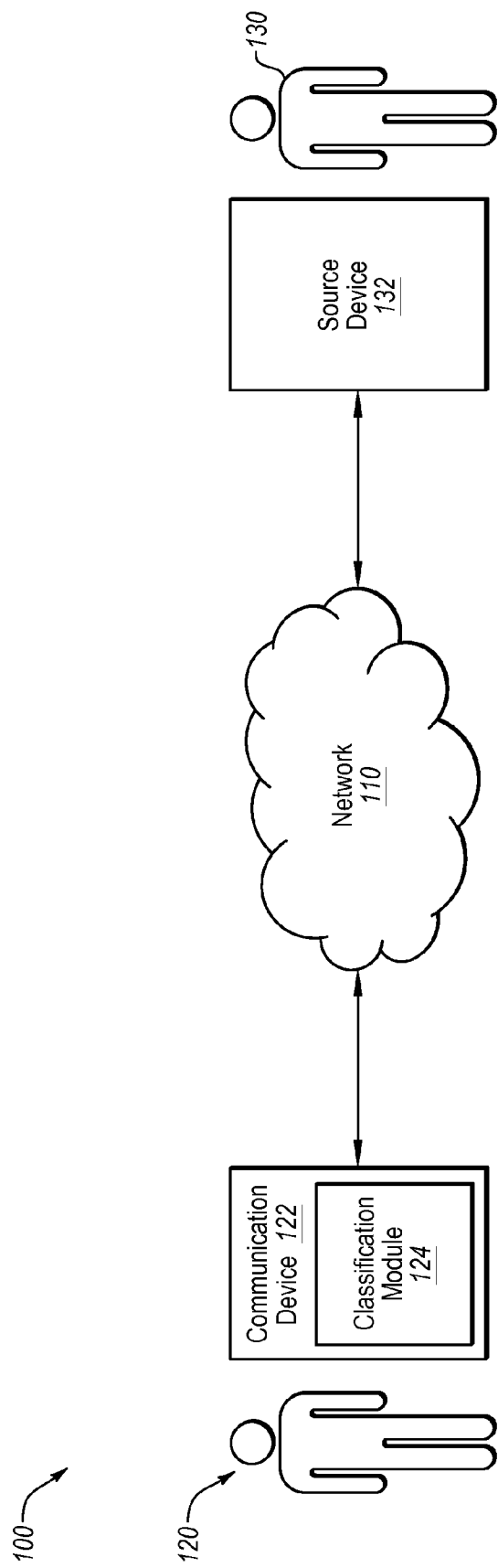
FIG. 1 illustrates an example system that classifies communications using human-based interactive questions.

Some embodiments described herein relate to classifying communications using human-based interactive questions. Generally, communications between individuals, companies, or other entities may be in many different forms. For example, communications may be emails, text messages, such as short messaging service (SMS) messages and multimedia messaging service (MMS) messages, video conferencing, and phone calls, among others.

In some embodiments, the communication may be a phone call received from a source. In these and other embodiments, the phone call may be classified using human-based interactive questions before notifying a person of the phone call. To classify the phone call, a communication device of the person may receive the phone call and respond to the phone call by sending a first human-based interactive question to the source of the phone call. The communication device may receive a first answer from the source.

For example, when the first answer incorrectly answers the first human-based interactive question, the communication device may classify the phone call as a phone call to reject and accordingly reject the phone call. When the first answer correctly answers the first human-based interactive question, the communication device may send a second human-based interactive question to the source. The communication device may receive a second answer from the source. When the second answer correctly answers the second human-based interactive question, the communication device may classify the phone call as a notification phone call and proceed to notify the person of the communication and/or present the communication to the person. When the second answer incorrectly answers the second human-based interactive question, the communication device may classify the phone call as a voicemail phone call and proceed to send the phone call to voicemail. In this manner, the communication device may in some cases classify a phone call and act based on the classification of the phone call to reject the phone call, send the phone call to voicemail, or notify, present, or notify and present the phone call to the person. As an example, phone calls from solicitors may be rejected, phone calls from sources unable to answer a question about the person may be sent to voicemail, and phone calls from sources able to answer a question about the person may be presented to the person.

As another example, a method may include receiving, by a computing system, a notification of a vocal or verbal communication request that is sent from a source over a network to a user. The method may also include categorizing, by the computing system, the communication request. The categorizing may include sending a first vocal question over the network to the source. The first vocal question may include a first human-based interactive question. The categorizing may also include receiving a first answer communication over the network from the source in response to the first vocal question and determining whether the first answer communication correctly answers the first vocal question.

In response to determining that the first answer communication incorrectly answers the first vocal question, the categorizing may include performing a first task with the vocal communication request. In response to determining that the first answer communication correctly answers the first vocal question, the categorizing may include sending a second vocal question over the network to the source. The second vocal question may include a second human-based interactive question. The categorizing may also include receiving a second answer communication over the network from the source in response to the second vocal question and determining whether the second answer communication correctly answers the second vocal question. In response to determining that the second answer communication incorrectly answers the second vocal question, the categorizing may include performing a second task with the vocal communication request. In response to determining that the second answer communication correctly answers the second vocal question, the categorizing may include performing a third task.

Turning to the figures, FIG. 1 illustrates an example system 100 that classifies communications using human-based interactive questions. The system 100 may be arranged in accordance with at least one embodiment described herein. The system 100 may include a network 110, a first user 120, a communication device 122 that includes a classification module 124, a second user 130, and a source device 132.

The network 110 may be any network configured to send and receive communications from other devices. In some embodiments, the network 110 may be a conventional type, wired or wireless, and may have numerous different configurations. Furthermore, the network 110 may include a local area network (LAN), a wide area network (WAN) (e.g., the Internet), or other interconnected data paths across which multiple devices and/or entities may communicate. In some implementations, the network 110 may include a peer-to-peer network. The network 110 may also be coupled to or may include portions of a telecommunications network for sending data in a variety of different communication protocols. In some implementations, the network 110 includes Bluetooth® communication networks or a cellular communications network for sending and receiving communications and/or data including via SMS, MMS, hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

The communication device 122 may be a hardware device that is communicatively coupled with the network 110 through a wireless or wired connection. The communication device 122 may be configured to receive communications from and to send communications to other devices, such as the source device 132, through the network 110. In some embodiments, the communication device 122 may be a cellular phone, a smart phone, a personal assistant, a tablet computer, a computer, or some other wired or wireless device that allows a user to send and receive communications over the network 110.

In some embodiments, the communications sent and received over the network by the communication device 122 may be vocal communications, such as a phone call or a video conference. A vocal communication may include at least some type of verbal, spoken, voiced, oral, articulated, or the like communication. In some embodiments, the communications may be an email or text message, such as SMS and MMS messages, or other types of communications.

The communication device 122 may be associated with the first user 120 such that the communication device 122 receives communications designated for the first user 120. The communication device 122 may also be configured to receive input from the first user 120 such that the first user 120 may prepare and send communications to other devices over the network 110. The communication device 122 may also store other information about the first user 120 or otherwise interact with the first user 120.

The source device 132 may be a hardware device that is communicatively coupled with the network 110 through a wireless or wired connection. The source device 132 may be configured to receive communications from and to send communications to other devices, such as the communication device 122, through the network 110. In some embodiments, the source device 132 may be a cellular phone, a smart phone, a personal assistant, a tablet computer, a computer, a server, a cluster of servers, a networked system, or some other wired or wireless device that allows a user, such as the second user 130, or a manual or automated system to send and receive communications over the network 110. In some embodiments, the communications sent and received over the network by the source device 132 may be vocal communications, such as a phone call or a video conference. In some embodiments, the communications may be an email or text message, such as SMS and MMS messages, or other types of communications.

In some embodiments, the communication from the source device 132 may originate from the source device 132 without direct implementation from the second user 130. For example, the communication may be a system generated mass communication, such as a mass email or text message. Alternately or additionally, a communication may be a system generated phone call, such as from an auto call program used by a call center or other business or organization.

In some embodiments, the communication from the source device 132 may originate from the second user 130. In these and other embodiments, the second user 130 may use the source device 132 to generate and send a communication to the communication device 122. For example, the second user 130 may generate a text message or email using the source device 132 and then direct the source device 132 to send the text message or email over the network 110 to the communication device 122. Alternately or additionally, a communication may be a phone call sent to the communication device 122 based on the second user 130 directing the source device 132 to dial the communication device 122.

The communication device 122 may include a classification module 124. The classification module 124 may be configured to classify communications received over the network 110 at the communication device 122 before the communications are presented to the first user 120 or the first user 120 is notified of the communications. After classifying the communications, the classification module 124 may also be configured to direct the communication device 122 to handle the communications based on the classification of the communications.

In some embodiments, to classify a communication, the classification module 124 may send one or more human-based interactive questions to a sender of the communication before notifying or presenting the communication to the first user 120. Based on the answers provided in response to the human-based interactive questions, the classification module 124 may classify the communication. After classifying the communication, the classification module 124 may direct the communication device 122 to handle the communication based on the classification of the communication. In particular, the communication device 122 may perform a particular task with respect to communications with particular classifications. For example, a first task may be performed with a communication when the communication has a first classification and a second task, which is different from the first task, may be performed when the communication has a second classification.

In general, a human-based interactive question may be a question that a human may answer but general computer programs associated with generating, sending, and/or receiving communications cannot answer. For example, the human-based interactive question may challenge a receiving system to perform a human interaction or human judgment task to respond to the human-based interactive question. The following is list of example general human-based interactive questions: What year is it? Who is the first President of the United States? What color is the ocean? etc.

In some embodiments, the human-based interactive question may be specific or related to the first user 120 associated with the communication device 122. The following is a list of example user specific questions: What is the first user's occupation? What is the first user's height? What is the first user's middle name? What is the first user's vehicle color? What is the first user's house color? What is the first user's address? What is the first user's food preference? What kind of pet does the first user own? etc.

In some embodiments, the human-based interactive question may be a question that requests a free flowing verbal response or a free flowing written response. A free flowing verbal or written response may allow an answer to take multiple different forms that communicate the same idea. For example, for the question, "Where is the capital of the United States?" a free flowing correct response may be one of the following: D.C., Washington, Washington D.C., or the District of Columbia. In some embodiments where the answer may be a verbal answer, the communication device 122 may include speech recognition capabilities to translate the verbal answer to digital information that may be used by the classification module 124 to determine the correctness of the answer.

As another example, the human-based interactive question may be a sound and/or an image provided to a receiving system with a request that the sound or the image be identified. As an example, the human-based interactive question may provide an image of a black Labrador retriever and request that the image be identified. A correct answer may include: a dog, a lab, a Labrador retriever, a Labrador, a canine, a black lab, or something similar.

Alternately or additionally, the human-based interactive question may provide a list of possible answers and request the selection of the answer from the list of possible answers. For example, the human-based interactive question may be a multiple choice type question with selected responses. In these and other embodiments, the answers may be a selected verbal or written answer. For example, the human-based interactive question may be a sound or an image with a request that the answer be selection from multiple choices provided with the sound or image. As a specific example, the human-based interactive question may provide an image of a black Labrador retriever and request that the answer be selection from choices of a Labrador retriever, a piece of coal, or a wolf.

Alternately or additionally, a response may be a verbal or a written selection of the choice. For example, the request may indicate to select from the following: 1—Labrador retriever, 2—a piece of coal, or 3—a wolf. In these and other embodiments, the answer may be a verbal or written expression of 1, 2, or 3. For example, when the communication is a phone call, the response may be a user or system keying 1, 2, or 3 to provide a keyed response with no verbal response.

The complexity of the human-based interactive question selected to be sent to the source device 132 may vary based on a classification to be applied to a communication. Generally, general knowledge human-based interactive questions, such as "What color is the sky?" may be used to classify the communication as originating from a human or a system. In these and other embodiments, when a general knowledge human-based interactive question is answered incorrectly, the communication may be classified as originating from a system. When a general knowledge human-based interactive question is answered correctly, the communication may be classified as originating from a human.

For example, when the communication is a phone call, a human-based interactive question provided in response to receiving the phone call may be the type of question that an automated dialing/phone calling systems may be unable to answer. Typically automated dialing/phone calling systems respond to a discrete number of inputs. As a result, a human-based interactive questions such as "What color is the sky?" may be unanswerable by an automated dialing/phone calling system. In contrast, most humans would be able to answer the question "What color is the sky?" Thus, when no answer is provided to the human-based interactive question, such as "What color is the sky?" the communication device 122 may classify the communication as originating from a system or non-human source. When a correct answer, such as "Blue" is provided to the human-based interactive question of "What color is the sky?" the communication device 122 may classify the communication as originating from a human.

More specific knowledge human-based interactive questions, such as "What type of pet do I own?" may be used to classify the communication as originating from a family member or close friend, an associate, an acquaintance, or a stranger. For example, when the second user 130 is a stranger to or business associate of the first user 120, the second user 130 may be able to answer a general knowledge human-based interactive question. However, the second user 130 who is a stranger to or business associate of the first user 120 may be unable to answer the question of "What type of pet do I own?" In contrast, when the second user 130 is a close friend or relative, the second user 130 may be able to answer the question of "What type of pet do I own?"

Alternately or additionally, more specific knowledge human-based interactive questions may be used by the communication device 122 to classify a communication as coming from a particular person or system. In these and other embodiments, the first user 120 may have previously sent or communicated a particular response to a particular human-based interactive question to the second user 130. The particular response may be unknown to others associated with the first user 120 or the communication device 122. When the communication device 122 receives the particular response from the source device 132, the communication device 122 may classify the communication as being from the second user 130.

The classification module 124 may include any number of classifications for a single type of communication. The number of classifications for a type of communication may determine the number of rounds of human-based interactive questions and answers that are performed by the classification module 124. In some embodiments, the number of human-based interactive questions may be one less than the number of communication classifications established by the classification module 124. For example, a first human-based interactive question may establish that the communication is type A or type B. A second human-based interactive question may establish that the communication is type B1 or type B2 of the type B. A third human-based interactive question may establish that the communication is type B2A or type B2B of the type B2.

For example, when an incorrect answer is provided to a first human-based interactive question, a communication may be classified as type A. When a correct answer is provided to the first human-based interactive question, the communication may be classified as type B, and the second human-based interactive question may be provide to the sender of the communication. When an incorrect answer is provided to the second human-based interactive question, the communication may be classified as type B1 of the type B. When a correct answer is provided to the second human-based interactive question, the communication may be classified preliminarily as type B2 of the type B, and the third human-based interactive question may be provide to the sender of the communication. When an incorrect answer is provided to the third human-based interactive question, the communication may be classified as type B2A of the type B2. When a correct answer is provided to the third human-based interactive question, the communication may be classified as type B2B of the type B2.

A human-based interactive question provided by the classification module 124 may be determined by the classification module 124. For example, general human-based interactive questions may be determined by the classification module 124 from a list of general human-based interactive question. Alternately or additionally, the classification module 124 may use information from a webpage, such as Wikipedia, to determine general human-based interactive questions. User specific human-based interactive questions may be generated by the classification module 124 based on the first user's 120 interaction with the communication device 122. For example, the classification module 124 may review communications, calendars, and web browsing, among other information to determine first user 120 specific human-based interactive questions. Alternately or additionally, a human-based interactive question provided by the classification module 124 may be determined by the first user 120 alone or in combination with the classification module 124.

The number of classifications for different types of communications may also vary or be the same. For example, text message communications may have two different types of classifications, emails may have three different types of classifications, and phone calls may have four different types of classifications.

The tasks associated with a classification of a communication may also vary based on the different types of communication. For example, answering a first question correctly for an email communication may result in the email being presented to the first user 120 when the first user 120 checks the communication device 122, without additional notification (such as an audible noise, vibration, or change in a user interface) to first user 120 of the receipt of the communication by the communication device 122. Alternately or additionally, answering a first question correctly for a text message communication may result in the communication device 122 notifying the first user 120 (e.g., by audible noise, vibration, or change in a user interface) of the text message.

In some embodiments, tasks associated with a classification of a communication or a number of classifications of a communication may change based on preferences of a user or information about the first user 120, which may be gathered by the communication device 122. For example, based on a calendar item for the first user 120 in the communication device 122, the classification module 124 may adjust the task for a communication associated with a particular classification or a number of classifications for a type of communication. For example, during a workday, the classification module 124 may apply two types of classifications to phone calls based on one human-based interactive question. When a correct answer is received for the human-based interactive question, the classification module 124 may notify the first user 120 of the phone call. When an incorrect answer is received, the classification module 124 may send the phone call to voicemail. In contrast, when a calendar on the communication device 122 indicates that the first user 120 has a scheduled event, the classification module 124 may apply three types of classifications to phone calls based on two human-based interactive questions. The two human-based interactive questions may include a general and a specific human-based interactive question. In these embodiments, the first user 120 may be notified or have presented a communication after a sender of the communication is able to provide a correct answer to the general and specific human-based interactive question. In this manner, the first user 120 may avoid being presented with or notified of communications from senders that are not associated enough with the first user 120 to answer the specific human-based interactive question.

In some embodiments, the classification module 124 may receive input from the first user 120 about the tasks performed by the communication device 122 based on the classification of a communication. For example, based on the user input, the tasks may be adjusted for each individual communication. In some embodiments, the classification module 124 may receive input from the first user 120 concerning the human-based interactive questions to be sent during specific time periods. For example, the first user 120 may indicate that particular (e.g., more difficult) human-based interactive questions be used during the evening or other scheduled events than at other times such that the first user 120 is notified of incoming communications during the evening or other scheduled events when the communication is from a person that has knowledge of or can answer the more difficult human-based interactive questions.

In some embodiments, the tasks associated with a classification of a communication may change a type or nature of the communication. For example, a communication may be a video conferencing request. In these and other embodiments, the classification module may send a specific human-based interactive question associated with the first user 120. When the sender of the video conferencing request is able to provide a correct answer, the classification module 124 may direct the communication device 122 to establish the video conferencing communication. When the sender of the video conferencing request is not able to provide a correct answer, the classification module 124 may direct the communication device 122 to establish a phone call in lieu of the video conference request.

A general example of classifying a communication is now provided. The second user 130 may direct the source device 132 to send a communication, such as a request for video conference over the network to the communication device 122. The communication device 122 may indicate to the classification module 124 that a communication has been received. Before the communication device 122 presents or notifies the first user 120 of the communication, the classification module 124 may select first and second human-based interactive questions to send to the source device 132 to classify the communication. The classification module 124 may send the first human-based interactive question to the source device 132 over the network 110. The source device 132 may present the first human-based interactive question to the second user 130 and may receive a first answer from the second user 130 in response to the first human-based interactive question. The source device 132 may send the first answer over the network to the communication device 122. The communication device 122 may provide the first answer to the classification module 124. The classification module 124 may determine if the first answer correctly answers the first human-based interactive question. When the first answer incorrectly answers the first human-based interactive question, the classification module 124 may delete the communication and the first user 120 may not be notified or presented with the communication.

When the first answer correctly answers the first human-based interactive question, the classification module 124 may send the second human-based interactive question to the source device 132 over the network 110. The source device 132 may present the second human-based interactive question to the second user 130 and may receive a second answer from the second user 130 in response to the second human-based interactive question. The source device 132 may send the second answer over the network to the communication device 122.

The communication device 122 may provide the second answer to the classification module 124. The classification module 124 may determine if the second answer correctly answers the second human-based interactive question. When the second answer incorrectly answers the second human-based interactive question, the classification module 124 may notify the first user 120 of the communication and allow the communication device 122 to establish a voice call but not a video conference with the source device 132. When the second answer correctly answers the second human-based interactive question, the classification module 124 may notify the first user 120 of the communication and allow the communication device 122 to establish a video conference with the source device 132.

In view of this disclosure, it will be appreciated that modifications, additions, or omissions may be made to the system 100 without departing from the scope of the present disclosure. For example, in some embodiments, the system 100 may not include a second user 130. In these and other embodiments, the source device 132 may be an automated communication system. Alternately or additionally, the system 100 may operate when the first user 120 is not interacting or in proximity of the communication device 122 to allow the communication device 122 to notify the first user 120 of a communication.

Figure 2A:
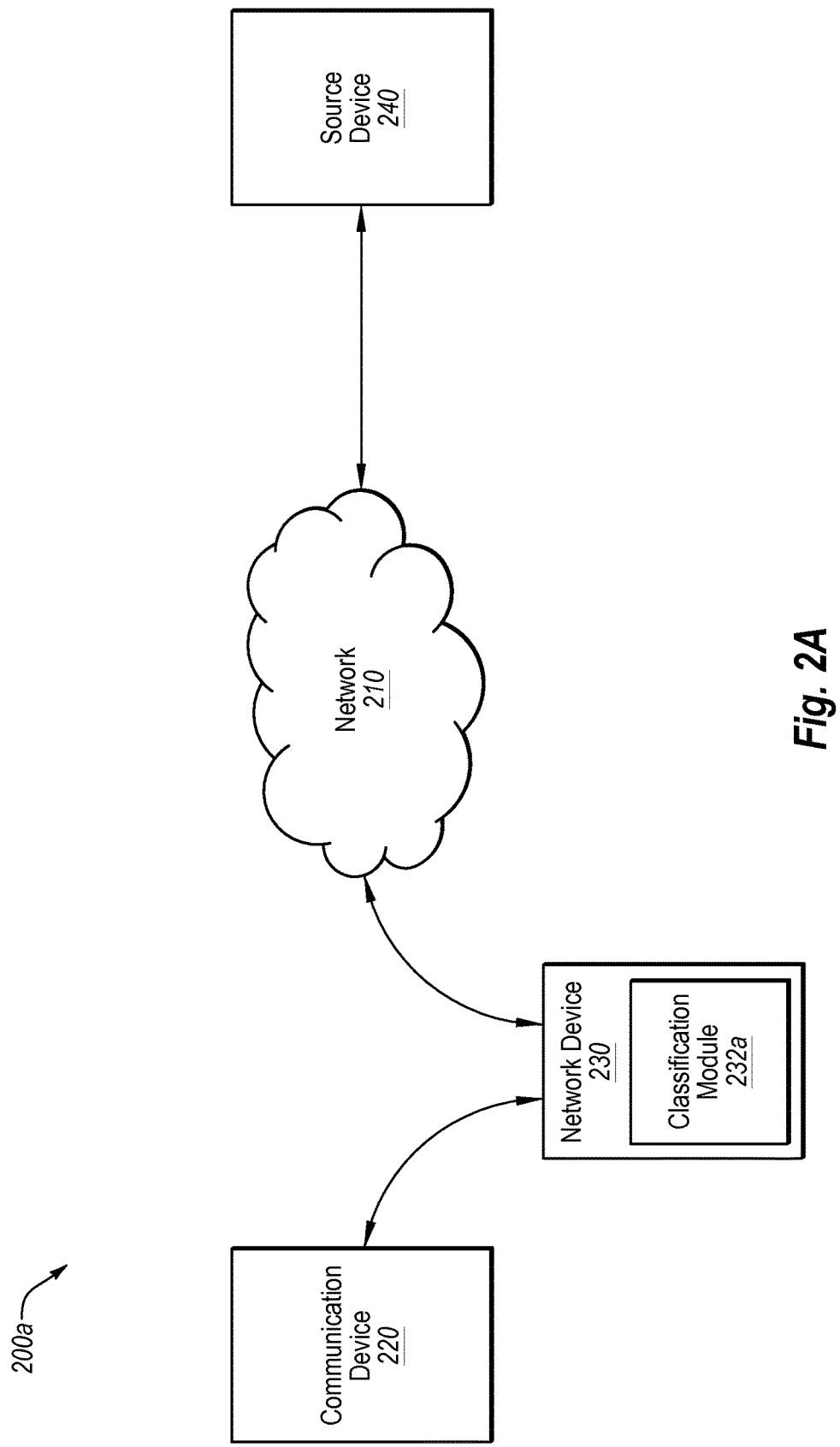
FIG. 2A illustrates another example system that classifies communications using human-based interactive questions.

FIG. 2A illustrates another example system 200A that classifies communications using human-based interactive questions, arranged in accordance with at least one embodiment described herein. The system 200A may include a network 210, a communication device 220, a network device 230 that includes a classification module 232a, and a source device 240. The network 210, the communication device 220, and the source device 240 may be analogous to the network 110, the communication device 122, and the source device 132 of FIG. 1. Accordingly, no further description of the network 210, the communication device 220, and the source device 240 are provided with respect to FIG. 2A.

The network device 230 may be a hardware device communicatively coupled between the network 210 and the communication device 220. Communications directed to the communication device 220 from the network may pass through the network device 230. As an example, the network device 230 may be a modem, router, computer, or answering machine, or some other hardware device that passes communications from a network to a communication device, such as the communication device 220.

The classification module 232a in the network device 230 may be configured to classify communications received at the network device 230 before the communications are provided to the communication device 220 for presentation to a user of the communication device 220. The classification module 232a may be configured to classify communications using human-based interactive questions in a manner analogous to the manner in which the classification module 124 of FIG. 1 classifies communications.

An example of the operation of the system 200A follows. The network device 230 may receive a communication over the network 210 from the source device 240 addressed to the communication device 220. The network device 230 may hold the communication until the communication may be classified by the classification module 232a. The classification module 232a may classify the communication using one or more human-based interactive questions and answers received from the source device 240 in response to the human-based interactive questions. Once the communication is classified, the network device 230 may perform the appropriate task with the communication. In some embodiments, the task performed by the network device 230 may be similar to the tasks performed by the communication device 122 of FIG. 1. For example, some tasks include, deleting the communication, storing the communication, providing the communication to the communication device 220, or altering the communication, among other tasks.

In view of this disclosure, it will be appreciated that modifications, additions, or omissions may be made to the system 200A without departing from the scope of the present disclosure. For example, in some embodiments, the network device 230 may be communicatively coupled with multiple communication devices 220. In these and other embodiments, the classification module 232a may classify communications designated for one or more of the multiple communication devices 220.

Figure 2B:
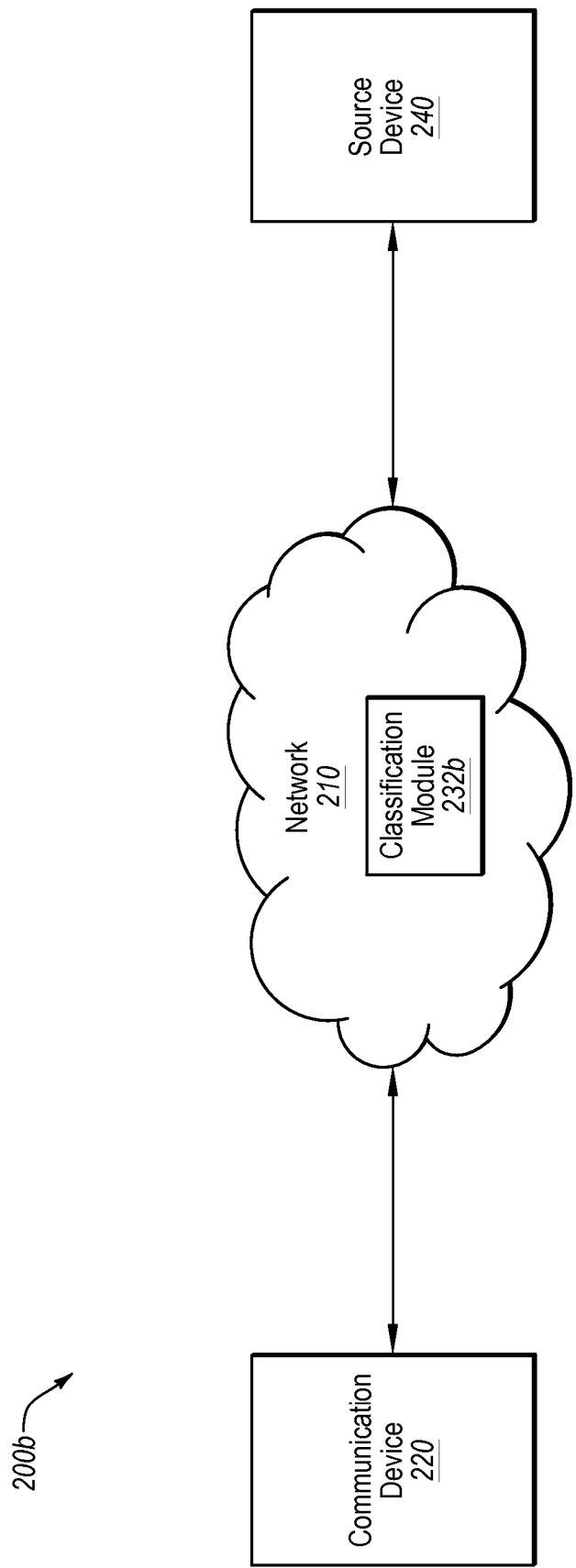
FIG. 2B illustrates still another example system that classifies communications using human-based interactive questions.

FIG. 2B illustrates another example system 200B that classifies communications using human-based interactive questions, arranged in accordance with at least one embodiment described herein. The system 200B may include the network 210, the communication device 220, and the source device 240 as described in FIG. 2A. In the system 200B, the network 210 may include the classification module 232b.

The classification module 232b in the network 210 may be configured to classify communications received at the network 210 that are addressed to the communication device 220 before the communications are provided to the communication device 220 for presentation to a user of the communication device 220. The classification module 232b may be configured to classify communications using human-based interactive questions in a manner analogous to the manner in which the classification module 124 of FIG. 1 classifies communications.

An example of the operation of the system 200B follows. The network 210 may receive a communication from the source device 240 addressed to the communication device 220. The network 210 may hold the communication until the communication may be classified by the classification module 232b. The classification module 232b may classify the communication using one or more human-based interactive questions and answers received from the source device 240 in response to the human-based interactive questions. Once the communication is classified, the network 210 may perform the appropriate task with the communication. In some embodiments, the task performed by the network 210 may be similar to the tasks performed by the communication device 122 of FIG. 1. For example, some tasks include, deleting the communication, storing the communication, providing the communication to the communication device 220, or altering the communication, among other tasks.

It will be appreciated that, in view of this disclosure, modifications, additions, or omissions may be made to the system 200B without departing from the scope of the present disclosure. For example, in some embodiments, the network

210 may be communicatively coupled with multiple communication devices 220. In these and other embodiments, the classification module 232b may classify communications designated for one or more of the multiple communication devices 220.

Figure 3:
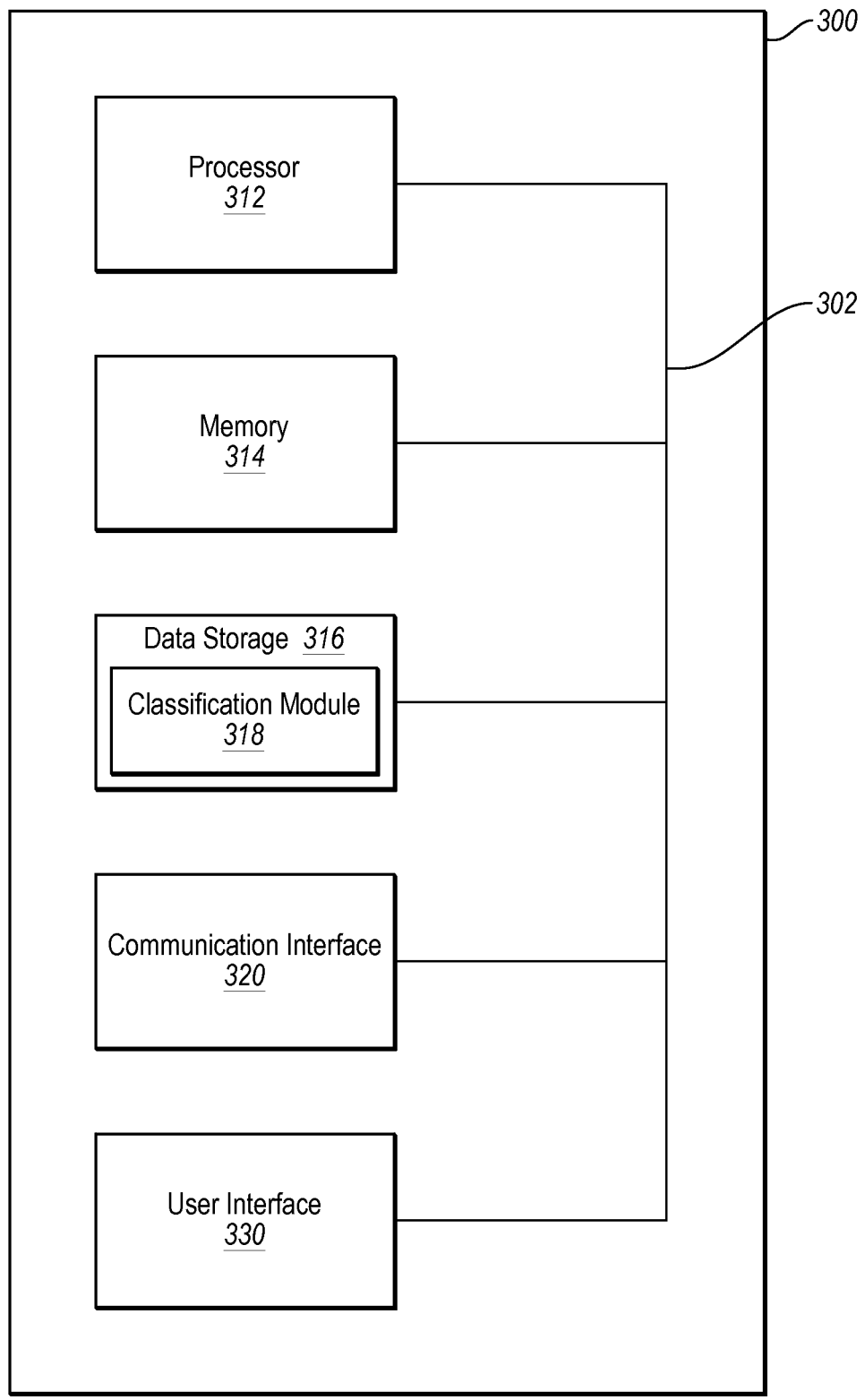
FIG. 3 illustrates an example device that classifies communications using human-based interactive questions.

FIG. 3 illustrates an example device 300 that classifies communications using human-based interactive questions, arranged in accordance with at least one embodiment described herein. The device 300 may include a processor 312, a memory 314, a data storage 316 that includes a classification module 318, a communication interface 320, a user interface 330, and/or a bus 302 that communicatively couples one or more of the processor 312, the memory 314, the data storage 316, the communication interface 320, and the user interface 330.

The processor 312 may include any suitable special-purpose or general-purpose computer, computing entity, or processing device including various computer hardware or software modules and may be configured to execute instructions stored on any applicable computer-readable storage media. For example, the processor 312 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 312 may include any number of processors configured to perform individually or collectively any number of operations described herein. Additionally, one or more of the processors may be present on one or more different electronic devices. In some embodiments, the processor 312 may interpret and/or execute program instructions and/or process data stored in the memory 314, the data storage 316, or the memory 314 and the data storage 316. In some embodiments, the processor 312 may fetch program instructions from the data storage 316 and load the program instructions in the memory 314. After the program instructions are loaded into memory 314, the processor 312 may execute the program instructions.

The memory 314 and data storage 316 may include computer-readable storage media for carrying or having computer-executable instructions or data structures stored thereon. Such computer-readable storage media may be any available media that may be accessed by a general-purpose or special-purpose computer, such as the processor 312. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 312 to perform a certain operation or group of operations.

The communication interface 320 may be one or more pieces of hardware configured to receive and send communications. In some embodiments, the communication interface 320 may include one or more of: an antenna, a wired port, and modulation/demodulation hardware, among other communication hardware devices. In particular, the communication interface 320 may be configured to receive a communication from outside the device 300 and to present the communication to the processor 312 for classifying or to send a communication from the processor 312 to another device or network.

The user interface 330 may be one or more pieces of hardware configured to notify a user of the device 300 of a communication, present a communication to a user, or to notify a user of a communication and present the communication to the user. In some embodiments, the user interface may include one or more of: a speaker, a microphone, a display, a keyboard, and a touch screen, among other hardware devices. In these and other embodiments, the user interface 330 may also be configured to receive input from a user of the device 300. The user input may include selecting, inputting, or inputting and selecting human base interactive questions, tasks, and user information, such as calendars, communication preferences, or contacts, among other information.

The classification module 318 may be program instructions stored in the data storage 316. The processor 312 may load the classification module 318 into the memory 314 and execute the classification module 318. When executing the classification module 318, the processor 312 may be configured to perform operations to classify communications received by the device 300. For example, a communication interface 320 may receive a communication and notify the processor 312 of the receipt of the communication. In some embodiments, the communication interface 320 may send the communication to the processor 312. The processor 312 may perform operations to determine a type of the communication. For example, is the communication a text message, email, phone call, or video conference, or some other type of communication.

After determining the type of the communication, the processor 312 may perform operations to select the human-based interactive questions, a number of the human-based interactive questions, and/or the tasks associated with the classification of a communication based on one or more of the type of the communication, a user's preference, and a user's status.

The user's preference may include information about when the communication is received, the type of the communication, and senders of the communication, among other information. For example, the human-based interactive questions for communications received during the night may be different than questions received during peak solicitor calling times. As another example, the user may have a preference to not send human-based interactive questions or send different human-based interactive question to communications from people not associated with contacts of the user stored in the data storage 316 of the device 300. As another example, the user may have a preference to send particular human-based interactive questions to communications received from people or systems outside a geographic area or to communications with particular characteristics. For example, when the communication is a phone call from an area code associated with solicitors, the processor 312 may select different human-based interactive questions.

The user's status may reflect information about the user known to the device 300. For example, when the device 300 includes information about a calendar of the user, the processor 312 may perform operations to select different human-based interactive questions or tasks based on the user being at an event, meeting, social gathering, or other information. Alternately or additionally, the processor 312 may use information about the location of the device to perform operations to select different human-based interactive questions or tasks. For example, when the processor 312 perform operations to determine that the device 300 is at home, a church, a movie theater, work, a restaurant, or other known location, the processor 312 may perform operations to select the human-based interactive questions or tasks accordingly.

After selecting a human-based interactive question, the processor 312 may send the selected human-based interactive question to the communication interface 320 for sending to the sender of the communication. The communication interface 320 may send the human-based interactive question and receive an answer in response to the human-based interactive question. The communication interface 320 may send the answer to the processor 312. The processor 312 may perform operations to determine whether the answer correctly answers the human-based interactive question. When the answer correctly answers the human-based interactive question, the processor 312 may perform operations to perform a first task. When the answer incorrectly answers the human-based interactive question, the processor 312 may perform operations to perform a second task.

The tasks performed may vary based on the one or more of the type of the communication, a user's preference, and a user's status as discussed previously. The tasks may include sending another human-based interactive to the sender of the communication, presenting the communication to the user, notifying the user of the communication, marking the communication, and/or deleting the communication, among other tasks.

In some embodiments, the processor 312 may perform operations to determine at least some information about a sender, e.g., a source of a communication. In these and other embodiments, the processor 312 may perform operations to save the sender in the data storage 316. In some embodiments, the processor 312 may perform operations to determine and save the sender in the data storage 316 when the sender is unable to correctly answer a human-based interactive question provided to the sender. In these and other embodiments, the processor 312 may perform operations to compile a record of the senders that are unable to correctly answer a human-based interactive questions and a number of times that sender sent a communication to the device 300. The compiled record may be used to identify senders that may be part of automated system or other senders unable to answer a human-based interactive question.

In view of this disclosure, it will be appreciated that modifications, additions, or omissions may be made to the device 300 without departing from the scope of the present disclosure. For example, in some embodiments, the device 300 may not include the user interface 330. In these and other embodiments, the device 300 may be a server or other computing device or system that receives user information over a network through the communication interface 320. In some embodiments, the different components of the device 300 may be physically separate and the bus 302 may be a networking bus that communicatively couples the different components of the device 300. For example, the data storage 316 may be part of a storage device that is separate from a server, which includes the processor 312, the memory 314, and the communication interface, that is communicatively coupled to the storage device.

Figure 4:
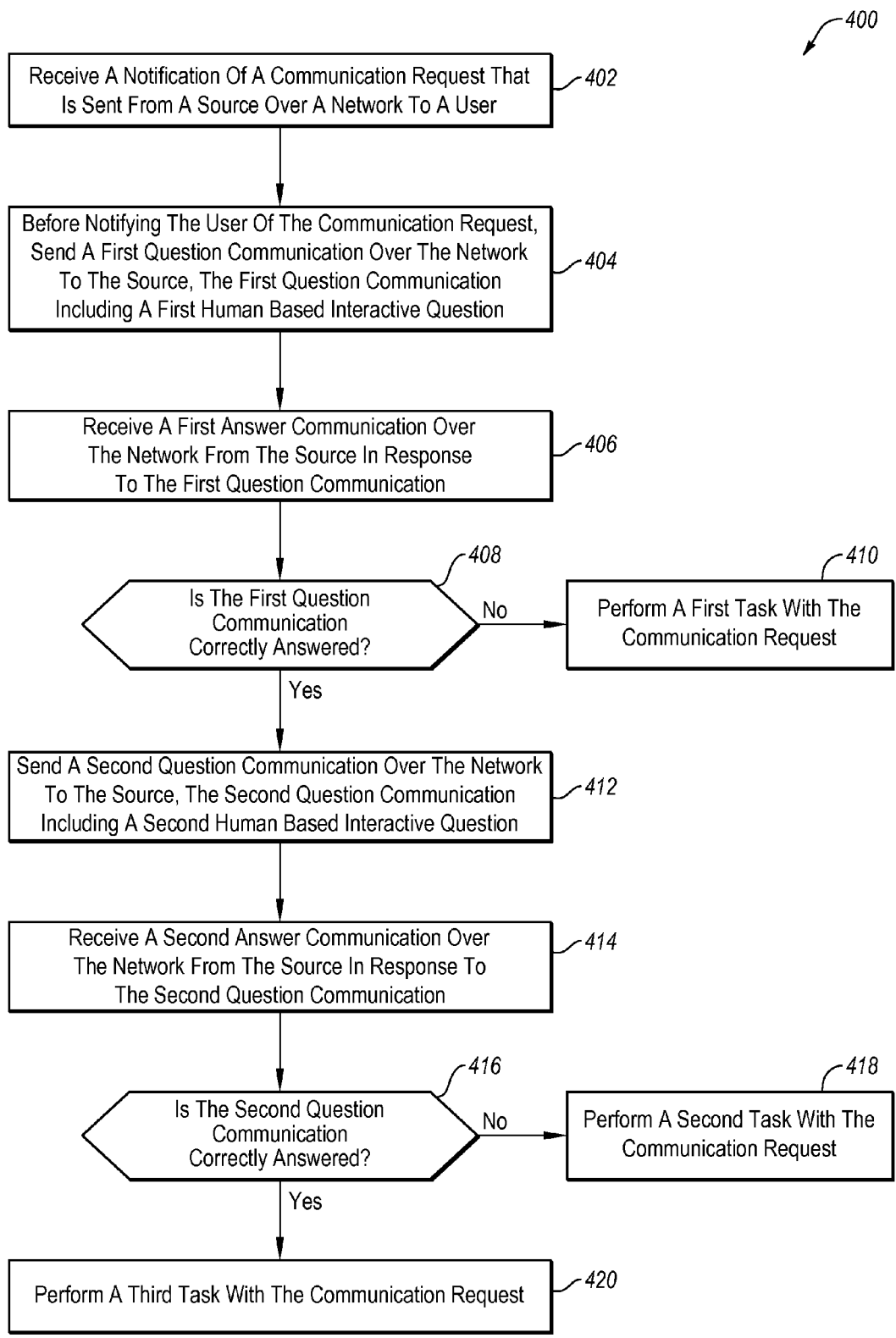
FIG. 4 is a flowchart of an example method of classifying communications using human-based interactive questions.

FIG. 4 is a flowchart of an example method 400 of classifying communications using human-based interactive questions, which may be arranged in accordance with at least one embodiment described herein. The method 400 may be implemented, in some embodiments, by a device, such as the device 122, 220, or 300 of FIGS. 1, 2, and 3, respectively. Although illustrated as discrete blocks, various blocks may be divided into additional blocks, combined into fewer blocks, or eliminated, depending on the desired implementation.

The method 400 may begin at block 402, where a notification of a communication is received that is sent from a source over a network to a user. The communication may be a vocal communication, such as an incoming phone call or a video conference request. In some embodiments, the communication may be text message or an email.

In block 404, before notifying the user of the communication, a first question communication may be sent over the network to the source. The first question communication may include a first human-based interactive question.

In block 406, a first answer communication may be received over the network from the source in response to the first question communication.

In block 408, it may be determined whether the first answer communication correctly answers the first question communication. When the first answer communication does not correctly answers the first question communication, the method 400 may proceed to block 410. When the first answer communication correctly answers the first question communication, the method 400 may proceed to block 412.

In block 410, a first task may be performed with the communication. In some embodiments, the first task may include rejecting the communication, directing the communication to a voicemail system, or notifying the user of the communication. In some embodiments, the communication may be rejected without notifying the source of the received communication that the received communication is rejected. In some embodiments, rejecting the communication may include tagging the communication as spam, failing to deliver the communication, or failing to notify the user of the communication.

In block 412, a second question communication may be sent over the network to the source. The second question communication may include a second human-based interactive question.

In block 414, a second answer communication may be received over the network from the source in response to the second question communication. In some embodiments, the first and second answer communications may include free flowing verbal responses, selected verbal responses, keyed responses, or some combination of free flowing verbal responses, selected verbal responses, or keyed responses.

In block 416, it may be determined whether the second answer communication correctly answers the second question communication. When the second answer communication does not correctly answers the second question communication, the method 400 may proceed to block 418. When the second answer communication correctly answers the second question communication, the method 400 may proceed to block 420.

In block 418, a second task may be performed with the communication.

In block 420, a third task may be performed with the communication. In some embodiments, the third task may include sending, by the computing system, a third vocal question over the network to the source, the third vocal question including a third human-based interactive question.

In some embodiments, when the vocal communication request includes a video conference request, the first task may include rejecting the video conference request, the second task may include initializing a voice connection with no video feed, and the third task may include initializing a video conference.

In some embodiments, the third task may include sending a third vocal question over the network to the source. The third vocal question may include a third human-based interactive question.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include obtaining a status of the user. In these and other embodiments one or more of the first task, the second task, and the third task may be determined based on the status of the user. The method 400 may further include obtaining from the user, one or more of the first vocal question, the second vocal question, the first answer communication, and the second answer communication.

In some embodiments, the method 400 may further include determining the source of the received communication; and compiling a record of received communications from the source that incorrectly answer the first question communication or other question communications.

In some embodiments, the method 400 may further include selecting the first question communication based on a type of the communication. In these and other embodiments, the first question communication may be further selected based on the type of the communication and input from the user regarding the type of the communication.

Figure 5:
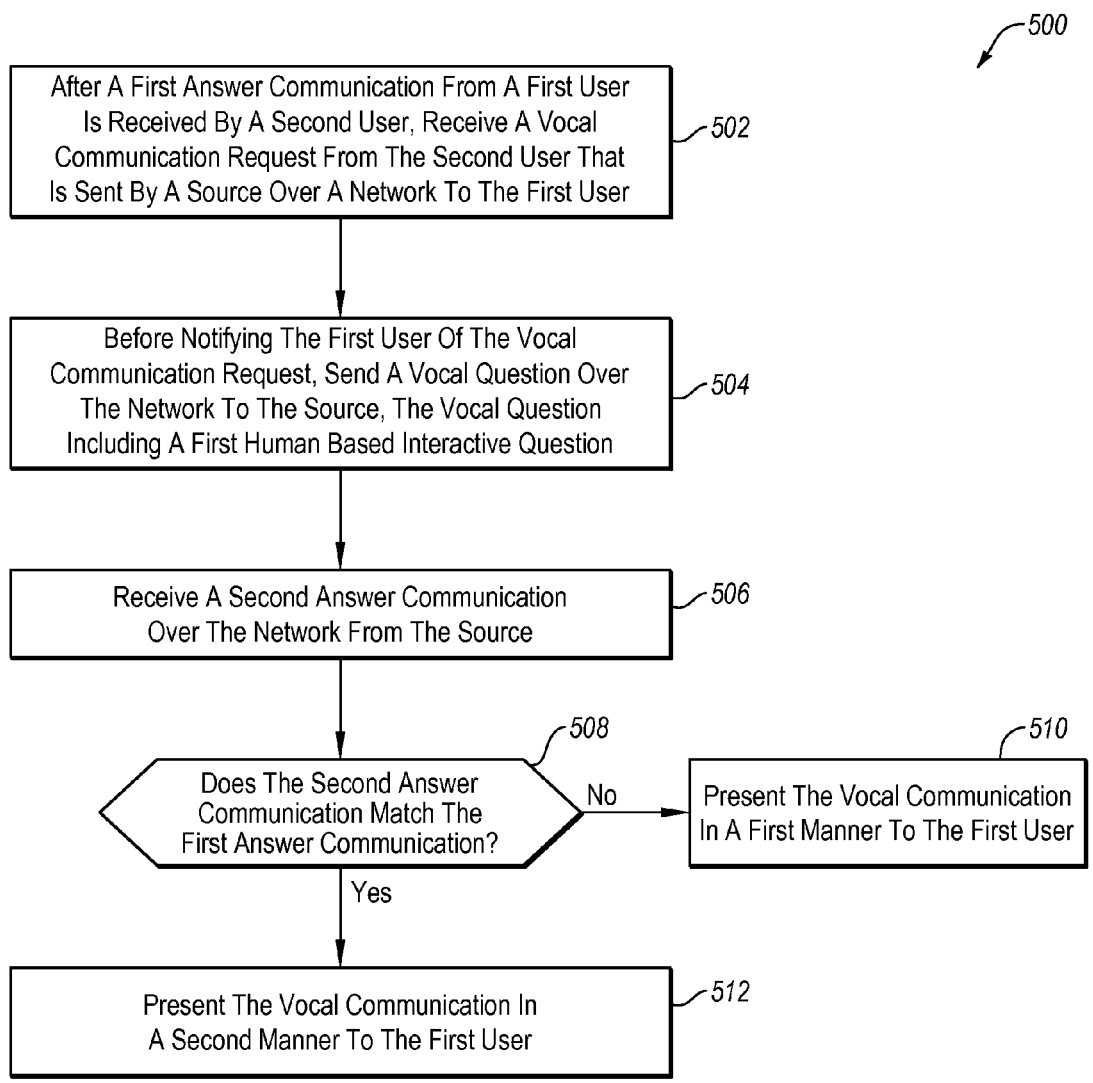
FIG. 5 is a flowchart of another example method of classifying communications using human-based interactive questions.

FIG. 5 is a flowchart of another example method 500 of classifying communications using human-based interactive questions, which may be arranged in accordance with at least one embodiment described herein. The method 500 may be implemented, in some embodiments, by a device, such as the device 122, 220, or 300 of FIGS. 1, 2, and 3, respectively. Although illustrated as discrete blocks, various blocks may be divided into additional blocks, combined into fewer blocks, or eliminated, depending on the desired implementation.

The method 500 may begin at block 502, where after a first answer communication from a first user is received by a second user, a vocal communication is received from the second user that is sent by a source over a network to the first user.

In block 504, before notifying the first user of the vocal communication, a vocal question is sent over the network to the source. The vocal question may include a first human-based interactive question. In block 506, a second answer communication may be received over the network from the source.

In block 508, it may be determined whether the second answer communication matches the first answer communication. When the second answer communication does not match the first answer communication, the method 500 may proceed to block 510. When the second answer communication matches the first answer communication, the method 500 may proceed to block 512.

In block 510, the vocal communication is presented in a first manner to the first user. In some embodiments, the vocal communication in the first manner may indicate to the first user that the second user initiated the vocal communication. In block 512, the vocal communication is presented in a second manner to the first user.

In some embodiments, the method 500 may further include obtaining from the first user the presentation of the vocal communication in the first manner and the second manner.

As indicated above, the embodiments described herein may include the use of a special purpose or general purpose computer (e.g., the processor 312 of FIG. 3) including various computer hardware or software modules, as discussed in greater detail below. Further, as indicated above, embodiments described herein may be implemented using computer-readable media (e.g., the memory 314 of FIG. 3) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   receiving, by a computing system, a notification of a communication request that is sent from a source over a network to a user, the communication request including a request for a video conference;
   categorizing, by the computing system, the communication request, the categorizing comprising:
      sending a first question over the network to the source, the first question including a first human-based interactive question;
      receiving a first answer communication over the network from the source in response to the first question;
      determining whether the first answer communication correctly answers the first question;
      only in response to determining that the first answer communication correctly answers the first question, sending a second question over the network to the source, the second question including a second human-based interactive question;
      receiving a second answer communication over the network from the source in response to the second question;
      determining whether the second answer communication correctly answers the second question; and
      in response to determining that the second answer communication incorrectly answers the second question, partially presenting the video conference to the user by allowing the video conference to be presented to the user on a communication device of the user with no video feed instead of fully presenting the video conference to the user, the fully presenting the video conference includes allowing the video conference to be presented to the user on the communication device of the user with the video feed.

2. The method of claim 1, wherein the second question is sent instead of:
   rejecting the communication request;
   or
   notifying the user of the communication request.

3. The method of claim 1, wherein the first and second answer communications include free flowing verbal responses, selected verbal responses, keyed responses, or some combination of free flowing verbal responses, selected verbal responses, or keyed responses.

4. The method of claim 1, further comprising obtaining, at the computing system from the user, one or more of: the first question, the second question, the first answer communication, and the second answer communication.

5. One or more non-transitory computer-readable media storing one or more programs that are configured, in response to being executed, to cause the computing system to execute the method as recited in claim 1.

6. One or more non-transitory computer-readable media having instructions stored thereon that, responsive to execution by one or more machines, cause the one or more machines to perform operations comprising:
   receiving a communication that is sent from a source over a network to a user, the communication including a video conference;
   categorizing the received communication, the categorizing comprising:
      in response to receiving the communication, sending a first question communication that includes a first human-based interactive question over the network to the source instead of allowing the video conference to be presented to the user on a communication device of the user;
      receiving a first answer communication over the network from the source;
      determining whether the first answer communication correctly answers the first question communication;
      in response to determining that the first answer communication correctly answers the first question communication, sending a second question communication that includes a second human-based interactive question over the network to the source;
      receiving a second answer communication over the network from the source;
      determining whether the second answer communication correctly answers the second question communication; and
      in response to determining that the second answer communication correctly answers the second question communication, fully presenting the video conference to the user instead of partially presenting the received communication to the user by allowing the video conference to be presented to the user on the communication device of the user with no video feed.

7. The one or more non-transitory computer-readable media of claim 6, wherein when the received communication is partially presented, the source of the received communication is not notified that the received communication is partially presented.

8. The one or more non-transitory computer-readable media of claim 6, wherein the operations further comprise, in response to the fist answer communication incorrectly answering the first question communication:
   determining the source of the received communication; and
   compiling a record of received communications from the source that incorrectly answer the first question communication.

9. A method, comprising:
   receiving a communication that is sent from a source over a network to a user, the communication including a video conference;
   categorizing the received communication using one or more processors, the categorizing comprising:

sending a first question communication that includes a first human-based interactive question over the network to the source;

receiving a first answer communication over the network from the source;

determining whether the first answer communication correctly answers the first question communication;

in response to determining that the first answer communication correctly answers the first question communication, sending a second question communication that includes a second human-based interactive question over the network to the source instead of allowing the video conference to be presented to the user on a communication device of the user;

receiving a second answer communication over the network from the source in response to the second question communication;

determining whether the second answer communication correctly answers the second question communication; and in response to determining that the second answer communication incorrectly answers the second question communication, only partially presenting the received communication to the user by allowing the video conference to be presented to the user on the communication device of the user with no video feed instead of fully presenting the video conference to the user, which includes allowing the video conference to be presented to the user on the communication device of the user with the video feed.

10. One or more non-transitory computer-readable media storing one or more programs that are configured, in response to being executed, to cause a system to execute the method as recited in claim 9.

11. The method of claim 9, wherein only partially presenting the received communication to the user includes allowing the video conference to be presented to the user on the communication device of the user with an audio feed.

12. The one or more non-transitory computer-readable media of claim 6, wherein partially presenting the received communication to the user includes allowing the video conference to be presented to the user on the communication device of the user with an audio feed.

13. The method of claim 1, wherein partially presenting the video conference to the user includes allowing the video conference to be presented to the user on a communication device of the user with an audio feed.

* * * * *